United States Patent
Kuroiwa et al.

[11] Patent Number: 5,816,976
[45] Date of Patent: Oct. 6, 1998

[54] DRIVING TORQUE CONTROL DEVICE AND METHOD FOR CONTROLLING DRIVING TORQUE

[75] Inventors: Hiroshi Kuroiwa, Hitachi; Seiji Suda; Masami Shida, both of Mito; Masahide Sakamoto, Hitachinaka, all of Japan

[73] Assignee: Hitachi, Ltd., Japan

[21] Appl. No.: 568,463

[22] Filed: Dec. 7, 1995

[30] Foreign Application Priority Data

Dec. 7, 1994 [JP] Japan ................................. 6-303875

[51] Int. Cl.⁶ .................................................. F16H 5/66
[52] U.S. Cl. ........................... 477/102; 477/101; 477/110
[58] Field of Search ..................... 477/102, 101, 477/109, 110

[56] References Cited

U.S. PATENT DOCUMENTS

| | | | |
|---|---|---|---|
| 4,800,781 | 1/1989 | Yasue et al. | 744/102 X |
| 4,811,224 | 3/1989 | Kuershner et al. | 477/102 X |
| 4,889,014 | 12/1989 | Iwata | 477/101 |
| 4,933,851 | 6/1990 | Ito et al. | 477/102 X |
| 5,038,287 | 8/1991 | Taniguchi et al. | 744/102 X |
| 5,091,584 | 2/1992 | Yoshimura et al. | 477/109 X |
| 5,094,125 | 3/1992 | Bota | 477/102 |
| 5,133,227 | 7/1992 | Iwatsuki | 744/101 X |
| 5,211,680 | 5/1993 | Sumimoto et al. | 477/102 X |
| 5,228,367 | 7/1993 | Kuriyama | 477/111 |
| 5,295,415 | 3/1994 | Abe et al. | 477/102 |
| 5,391,127 | 2/1995 | Nishimura | 477/110 |
| 5,476,425 | 12/1995 | Shiraishi et al. | 477/109 |

*Primary Examiner*—Charles A. Marmor
*Assistant Examiner*—Peter T. Kwon
*Attorney, Agent, or Firm*—Evenson, McKeown, Edwards & Lenahan, P.L.L.C.

[57] ABSTRACT

Disclosed is a driving torque control device for a vehicle comprising the elements. The device can effectively suppress fluctuation of engine torque. (1) Means for calculating a torque control timing to determine and output at least two control timings of an engine torque generated by an engine during speed shifting. (2) Means for calculating and outputting an engine torque control quantity in response to the output from said torque control timing calculating means to calculate and output the engine torque control quantity (3) Means for controlling the engine torque during speed shifting in response to the outputs from said engine torque control quantity calculating means.

The engine torque is reduced by a certain quantity at a first timing of said engine torque control timings, followed by increasing the engine torque at the second engine torque control timing, and then returning the engine torque to the engine torque of the time immediately before the first engine torque control timing.

12 Claims, 7 Drawing Sheets

DRIVING TORQUE CONTROL DEVICE AND METHOD FOR CONTROLLING DRIVING TORQUE

BACKGROUND OF THE INVENTION

1. Field of the Invention

This invention is related to a driving torque control device of a vehicle with an automatic transmission, and more particularly to a driving torque control device of an vehicle with an automatic transmission that reduces a gear shifting shock due to a torque fluctuation in gear shifting and to a method of controlling driving torque.

2. Description of the Prior Art

In a control method of controlling a driving torque using a conventional device, for example, one disclosed in Japanese Patent laid-open print No. 2-20817, a timing for starting and an ending of controlling an engine output torque drop for the purpose of reducing a gear shifting shock are obtained based on an engine rotation speed at the beginning of the gear shifting. As described in Japanese Patent laid-open print No. 5-5688, there is an example wherein the timings for starting and ending of controlling the engine output torque drop, for the purpose of reducing the gear shifting shock, are decided based on a ratio between an input shaft revolution speed of transmission and an output shaft revolution speed(the vehicle speed). That is, the timing is decided depending on the gear ratio. As described in Japanese Patent laid-open print No. 4-81658, the timing of starting a control to reduce the gear shifting shock is decided by the former method disclosed in 2-2081 and the timing of ending the control is decided by the latter method disclosed in 5-5688. In addition, as a control method of dropping the engine output torque of a conventional device, the following method is generally employed in which a memory storing ordinary characteristic data of an engine control device is switched to another memory storing characteristic data at gear shifting to control, as is seen in Japanese Patent laid-open print No. 5-7213.

FIG. 3 shows a time-chart explaining an example of a gear shifting shock reduction method of a conventional technique in which an ignition time is used as a control quantity to reduce an engine output torque. First, explained is the relation between an engaging process of a gear and a change of waveform of an output shaft torque of a transmission in a method wherein an ignition timing retard control is not done. At first, a gear shifting command is given, then the line pressure changes to operate a solenoid for the gear shifting. An engagement and disengagement of friction engaging elements such as a clutch having the corresponding gear ratio begin at the time $t_0$ so that an output shaft torque becomes once smaller. The disengagement of the engaging gears ends before shifting the gear at the time ts, and it changes to the transmission torque path of the gear after shifting the gear. As a result, the above mentioned gear ratio gradually changes to a gear ratio before gear shifting to a gear ratio after gear shifting, as shown by the line A in FIG. 3.

The output shaft torque suddenly increases when the time ts passes, then the torque becomes almost the constant value due to the restriction of an engaging limit torque of the friction engaging elements such as a clutch. This clutch is slipping during this period. When the output shaft torque reaches the shifting gear ratio at time tf, the output shaft torque sharply decreases to become a ordinary value. The interval between the time to ~ts is called a torque phase, and the interval between the time ts~tf is called an inertia phase.

On the other hand, the value of the line pressure is PL for a certain period of time from an gear shifting command. In the conventional control method, the output shaft torque in this inertia phase is controlled to suppress the output shaft torque. In the case where a retarding control at the ignition timing is employed, the wave form becomes a dashed line shown in FIG. 3.

When a torque of an engine is reduced by adding the retarding control of the ignition timing, the gearing operation becomes quicker, if the line pressure during a gear shifting is the same value as PL where a retarding control is not employed. Then, a gear ratio becomes as line B shown in FIG. 3, and the output shaft torque on the inertia phase becomes slightly smaller by ΔTo, compared with the case where there is no retarding control. The time for gear shifting shortens to be Δtus→Δtus'. The timings of the start and the end of a retarding control at the ignition timing are points t1 and t2 where the present gear ratio passes slicing levels S1 and S2 of the gear ratio as shown in FIG. 3, the level of which are predetermined.

The value of a retarding quantity Δθig at the ignition timing is set in advance and is constant. Therefore, while a gear shifting clock time is shortened by adding the retarding control at the ignition timing, the gear shifting shock does not reduce sharply because the reduction of the output shaft torque on the inertia phase is very small.

Generally, by adding a reduction control of the line pressure during the gear shifting to a retarding control at the ignition time, a remarkable reduction of a gear shifting shock is performed. The line pressure during the gear shifting is made small as PL', and the gear shifting clock time is set so as to be Δtus. Consequently, the output shaft torque on the inertia phase greatly reduces by the quantity of ΔTo' as shown in FIG. 3. In this case, the gear ratio changes to A line in FIG. 3.

The timings for starting and an ending for a retarding control are times t1' and t2' on slicing levels S1 and S2 of the above gear ratio. As explained above, a gear shifting shock was reduced by carrying out the control of torque shift down for engine torque in the past. In the above mentioned conventional method of reduction of gear shifting shock, as shown by the solid line and the dashed line in FIG. 4, there was a problem. That is, it was difficult to optimize the timing for starting and ending of a retard at the ignition time, especially the timing for ending. The reason of the above is as follows.

An output shaft torque of inertia phase on the initial stage should be increased stepwise or pulsewise by the rotating inertia of an engine and a transmission, which can be presumed from the characteristics of the gear ratio change dependent on time shown in FIG. 3. But, the output shaft torque is characteristics that rise in right hand by the influence of incremental characteristics that are hydraulic characteristics acting on a clutch dependent on time of the engaging torque of a clutch. On the other hand, when the gear engagement is completed, the output shaft torque of the inertia phase on the latter period becomes small in stepwise.

As is mentioned above, the output shaft torque of inertia phase at the initial stage increases gradually. But the output shaft torque of inertia phase on the latter period decreases rapidly. That is, these are asymmetrical torque characteristics with respect to time. The engine output torque has temporally retarding characteristics with respect to the time change in ignition timing correction quantity, that is, the temporary retarding characteristics of a transmission output shaft torque. Therefore, when control is done on conventional ignition correction timing as C in FIG. 4, the engine output torque retards stepwise to the extent of a constant quantity at the time t.

When a retarding quantity is returned stepwise to 0 at the time t, the output shaft torque becomes characteristics C and C' shown in FIG. 4 due to superposing of the temporary retarding characteristics to the output shaft torque. That is, the ascending characteristics are retarding ones, but the descending characteristics becomes undershoots. Next, when the control is done on conventional ignition correction timing as D in FIG. 4, the ascending characteristics overshoot a little bit but not so serious, and the descending characteristics go down stepwise after an rapid increase of torque.

As is apparent from the above explanation, there is not a large difference in the waveform of output shaft torque even if a retarding start timing deviates a little from t1 to t1'. But, if the t2 as a retarding ending timing is a little early, the output shaft torque once increases rapidly and then it declines later to the predetermined value. On the other hand, if the t2 is retarded, there is a problem that the most suitable ending timing can not be obtained because the output shaft torque once undershoots. This invention is based on the conventional technical problems.

SUMMARY OF THE INVENTION

An object of this invention is to suppress a driving torque fluctuation by controlling an engine torque thereby to improve feeling of speed shifting, such as, gear shifting, continuous variable transmission (CVT), etc. by reducing the speed shifting shock and to improve the endurance of a corresponding clutch.

The retarding starting timing is set at the optimum time and the ascending and the descending characteristics of the waveforms of output shaft torque at the time of speed shifting of a vehicle are made smooth by adjustment of the retarding ending timing and retarding quantity. As a result, a control device that can properly reduce a gear shifting shock can be provided.

One aspect of the present invention is a driving torque control device which comprises the following elements.

A control timing calculating means for determining and outputting a control timing of an engine in gear shifting.

An engine torque control quantity calculating means for calculating, determining and outputting an engine torque control quantity based on information from the control timing calculating means.

An engine torque control means for controlling an engine torque of the engine in the gear shifting in accordance with information from the engine torque control quality calculating means.

The torque control timing calculating means outputs at least 3 control timing signals. The first control timing lowers a certain quantity of the engine torque, and the third control timing is predicted from the second control timing. A time-variant reduction quantity of the engine torque between the second and the third control timings is decided by the predicted value. Then, the engine torque is increased once after the third control timing, and it is returned to the state before the first control timing.

Another aspect of the present invention is the use of ignition timing or quantity of fuel as a control element for engine torque control at gear shifting. The engine torque control timing calculating means outputs at least three timing signals in the following manner. Gear ratios of the input shaft rotation speed of the transmission to the input shaft rotation speed of the transmission are calculated at predetermined time intervals, and the calculated ratios are compared with slice level values which are preset and stored n advance at each calculating cycle thereby to determine change timing of the engine torque.

The engine torque control quantity calculating means determines correction quantities and outputs signals corresponding to the correction quantities based on the correction of the torque-reductions of the engine that are preset and stored in advance and changing rates of the gear ratio in accordance with timing signals from the engine torque control timing calculating means.

The engine torque control means outputs, based on signals from the engine torque control calculating means, signals of ignition timing or correction of fuel as an element for correcting the engine torque control. According to this invention, the ascending and descending characteristics of the waveforms of output shaft torque become smooth so that a remarkable reduction of the gear shifting shock can be realized.

The control is carried out by a microcomputer to which necessary information and data memorized in a memory are given.

When an ignition timing is used as an element of controlling engine torque to correct the engine torque, the retarding starting timing of an ignition time for a torque reduction of the engine is carried out stepwise in an optional retarding time retarding quantity set in advance. As the retarding quantity lowers gradually and after it passes zero point, the retarding ending timing is advanced with a time-variant inclined angle until the engine knocking does not take place.

When the advanced value is reached to the predetermined value that is memorized in advance, it is returned to the state of retarding quantity 0 with the inclined angle with respect to time. In this manner, both the waveforms of the ascending and the descending of the output shaft torque become smooth, and they are smoother than those obtained by the conventional method so that remarkable reduction of a gear shifting shock can be realized.

DETAILED DESCRIPTION OF PREFERRED EMBODIMENTS

Examples in this invention are explained in detail by using drawings as follows.

Figure 1:
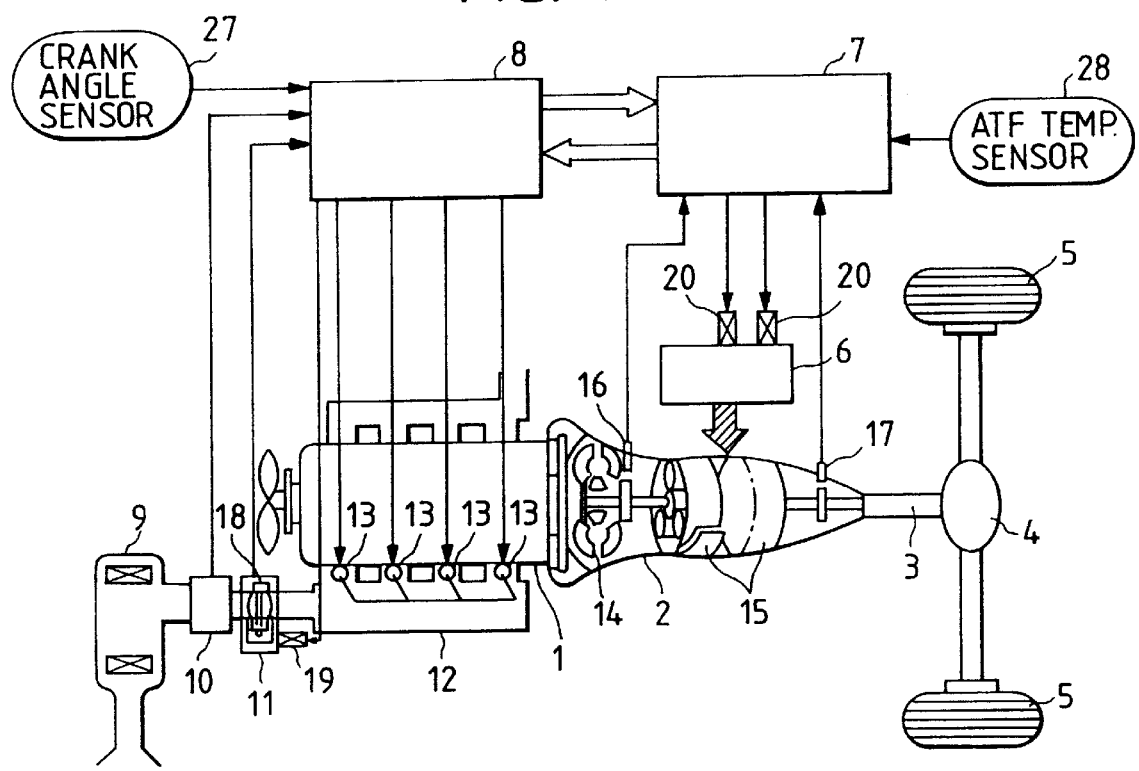
FIG. 1 shows a system diagram of this invention.

FIG. 1 is a system diagram of this invention, wherein 1 denotes engine, 2 automatic transmission (AT), 3 propeller shaft, 4 differential gear, 5 driving shaft, 6 hydraulic circuit of AT, 7 AT control unit installed with a micro computer (ATCU), 8 engine control unit installed with a microcomputer (ECU), 9 air cleaner, 11 throttle controller, 12 suction manifold, and 13 injector for injecting fuel.

The inside of AT 2 is further divided into the torque converter 14 and the gear train 15, which is installed with turbine sensor 16 for detecting an input rotation speed of transmission, that is, an output rotation speed of torque converter 14 and the sensor 17 for detecting an output rotation speed of transmission.

Information from such as crank angle sensor 27, air flow sensor 10 and throttle opening sensor 18 are input into ECU 8, and various calculations of, such as, an engine rotation speed signal, etc. are carried out. Then a throttle operation signal is output to injector 13 for controlling a quantity of fuel. Further, a throttle operation signal is output to idle speed control valve ISC 19 to control a correction air volume, thereby to control ignition timing by outputting a signal to the ignition plug not shown in the figure.

On the other hand, signals are input into ATC 7 from the transmission output shaft rotation speed sensor 17, AT oil temperature sensors 28, the engine rotation speed from ECU 8 and the throttle opening signal, etc. calculations are carried out to output signals of, such as, hydraulic circuit 6, the throttle operation signal of the change-over magnet valve 20, the driving signal of ISC 19, a signal for correcting the ignition time.

Figure 2:
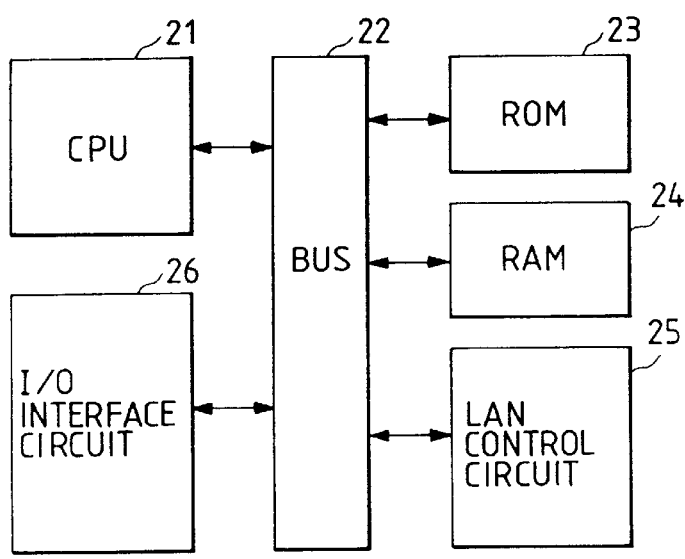
FIG. 2 shows a diagram of a torque control device to which this invention is applied.
Figure 3:
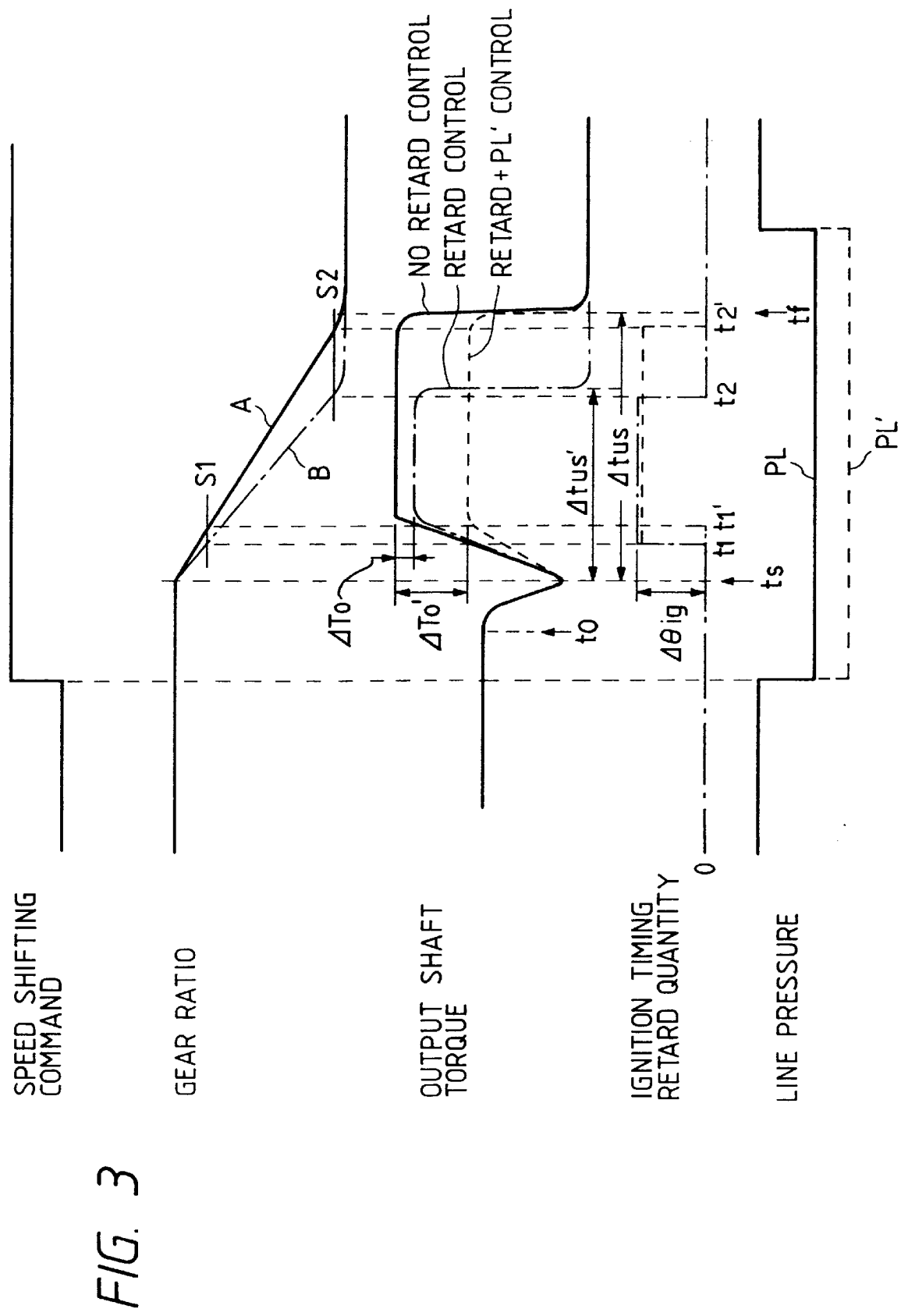
FIG. 3 shows the time chart for a method of a conventional up-shifting shock and its reduction.

A constitution example of the above mentioned ATC 7 or ECU 8 is shown in FIG. 2. The control device comprises at leas t CPU 21, ROM 23, RAM 24, input-output interface circuit 26 and buss 22 that communicates the above elements. As shown in FIG. 1, LAN control circuit 25 is necessary to link by LAN with ATC 7 and ECU 8. By integrating ATCU 7 and ECU 8, even one CPU that has both functions of the ATCU and ECU can achieve the desired results of this invention.

Figure 5:
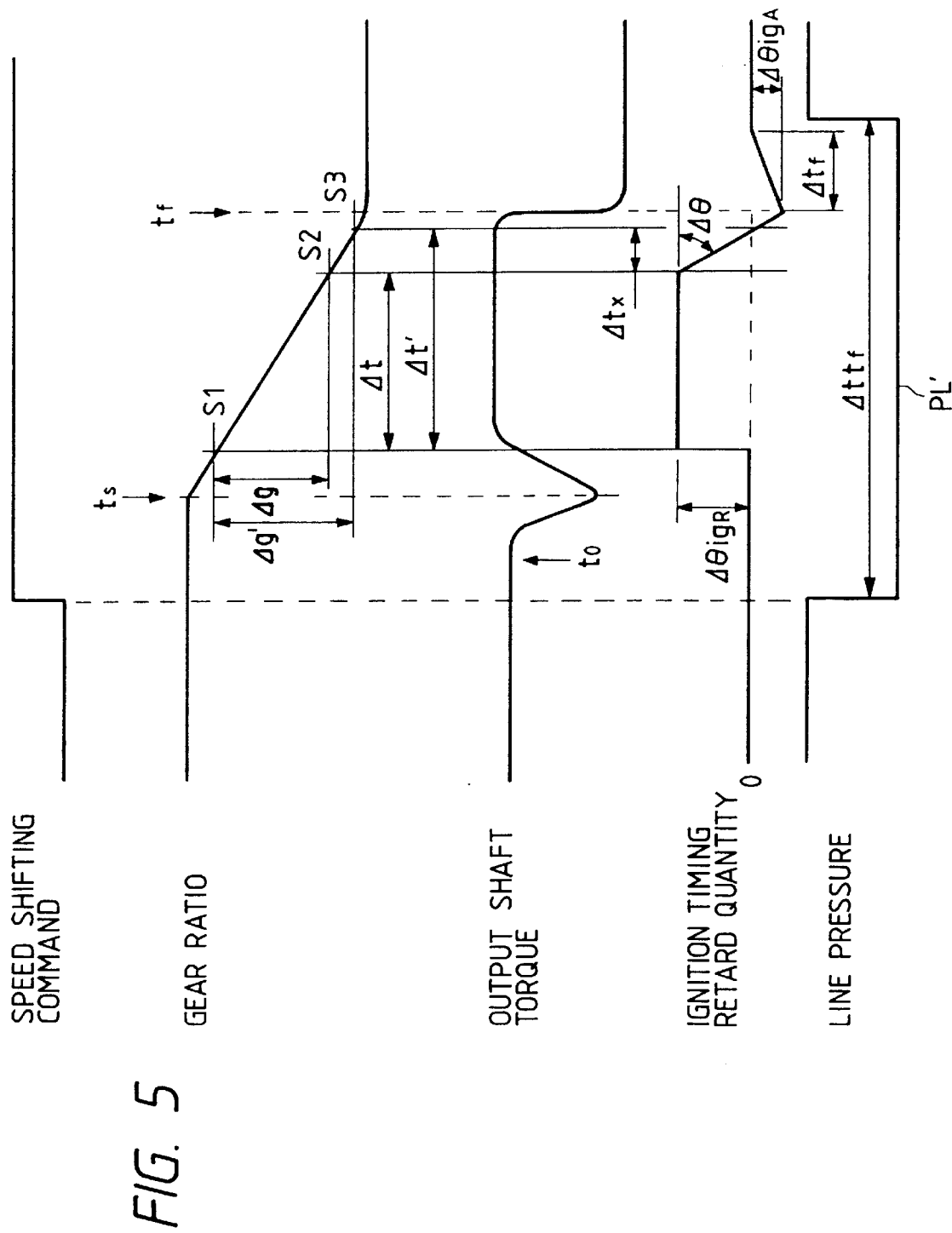
FIG. 5 shows a time chart for a method of up-shifting shock and its reduction of this invention.

FIG. 5 shows a time chart in an example of a method of up-shifting shock and its reduction in this invention. A gear shifting control starts with a gear shifting command, and a driving signal of the line pressure solenoid is changed to the line pressure PL' at the gear shifting when a gear shifting command is given. The time $\Delta ttf$ that keeps changing is set longer than the actual gear shifting ending time tf by a floating time as an allowance. While not shown, when a gear shifting command is given, a hydraulic pressure change-over magnet valve 20 operates, the engagement of engaging friction elements such as a clutch and a brake for gear shifting is started. Consequently, the engagement of a gear for gear shifting is started. That is, the engagement and the release of friction engaging elements such as the clutch starts at the time to. As a result, the output shaft torque becomes small once. And then, the release of the engaging gear ends at the time ts before gear shifting and is changed to the transmission torque path of a gear after gear shifting. By this change-over, the gear ratio gradually changes to a gear ratio after gear shifting from the gear ratio before gear shifting. The output shaft torque increases rapidly after passed the time ts.

On the other hand, as shown in FIG. 1, a ratio of the input shaft rotation number to the output shaft rotation number, i. e. The gear ratio that is detected by turbine sensor 16 and transmission output shaft rotation number detection sensor, i. e. vehicle speed sensor 17 is obtained by calculating in a predetermined time intervals such as 10 ms. After a gear shifting is given, the gear ratio obtained at every fixed time interval is compared with the value of the first slicing level S1, which is set and memorized in advance. When a determined gear ratio becomes smaller than that of S1, the torque shift down control of an engine starts. That is, a correction quantity at the ignition timing is set in advance, and an engine is controlled by a memorized retarding quantity $\Delta\theta igR$. Thereafter, the value of the second slicing level S2, which is set and memorized in advance, is compared with the gear ratio obtained every fixed time interval. When the determined gear ratio becomes smaller than the value of S2, the quantity of a torque shift down of an engine, that is, the correction quantity of the ignition timing is changed gradually.

A method for changing the correction quantity is explained as follows.

When a gear ratio becomes smaller than the value of S2, required time $\Delta t$ from S1 to S2 is calculated. As the change $\Delta g$ of a gear ratio from S1 to S2 and the change of gear ratio are known, the time $\Delta t'$, required for reaching the third slicing level S3 which is at just before the end of gear shifting, can be predicted by calculating as $\Delta t'=t\times\Delta g'/\Delta g$. Therefore, the required time $\Delta tx$ from S2 to S3 is obtained by 66 $tx=\Delta t'-\Delta t$. If the retarding quantity is set to pass the point 0 at the point of S3, the time-variant change angle $\Delta\theta$ of the correction quantity at the ignition timing after S2 is automatically obtained by both the retarding quantity $\Delta\theta igR$ and the required time $\Delta tx$ between S2 to S3.

By subtracting advance quantity step by step from the retarding quantity $\Delta\theta igR$ in accordance with this $\Delta\theta$, changes as shown in FIG. 5 of the correction quantity of an ignition time after S2 can be gained. The correction quantity of an ignition time after S3 gradually increases an advance amount according to the time-variant change angle $\Delta\theta$ of the correction quantity on the above ignition time. When the correction quantity reaches the advance value $\Delta\theta igA$, which is set and memorized in advance, the advance is decreasing gradually so that the correction quantity at the ignition time becomes 0 (zero) at reset time $\Delta tf$.

Figure 4:
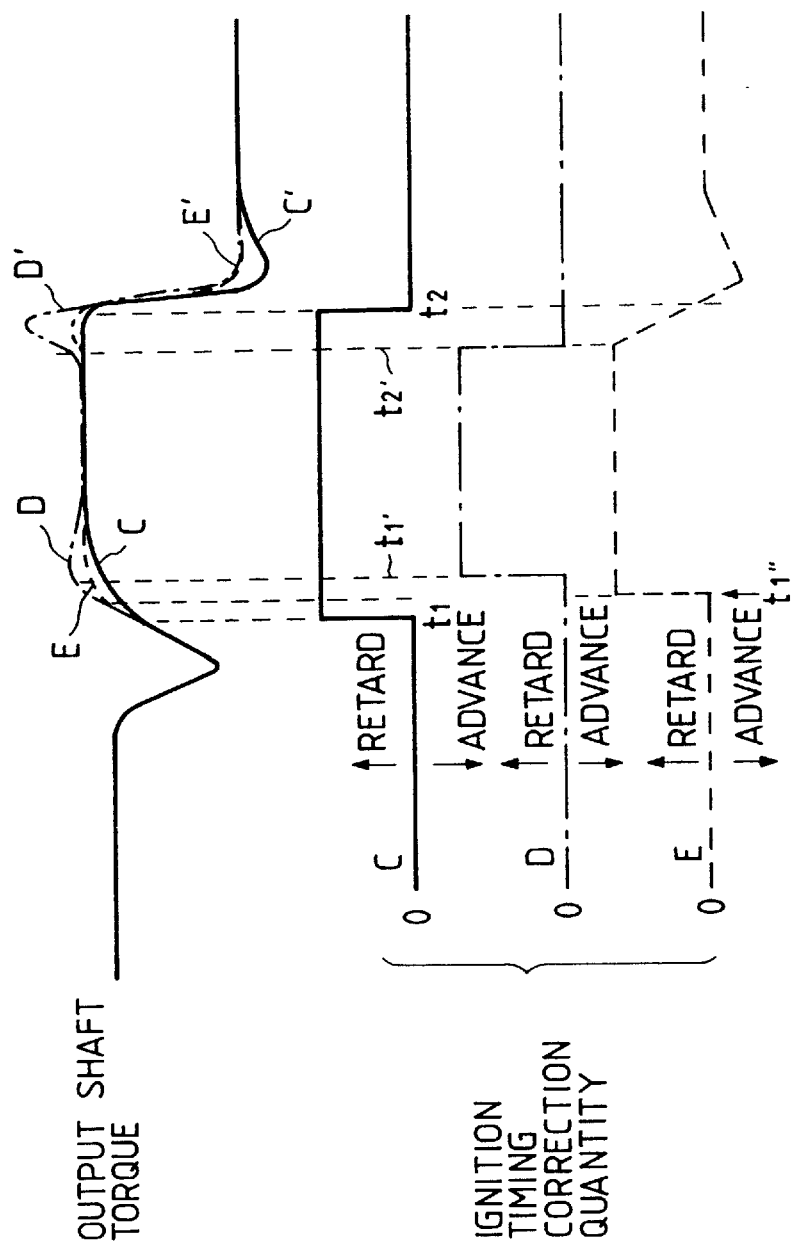
FIG. 4 is a figure that compares a method of a shock reduction of a conventional up-shifting with that of this invention, which shows a time chart using an ignition timing as an element for engine torque control.

The above example of this invention is explained by comparing it with the conventional example shown in FIG. 4.

The control method of this invention which is carried out by correcting the ignition time is shown in FIG. 4. The retarding start timing of the above example is done stepwise, for example, at the time t1" during the time period of t1~t1'. The retarding ending timing gradually reduces a retarding quantity at the time t2'. After having passed the retarding quantity 0 at the time t2, the angle with an inclined angle dependent on time is advanced until just before occurrence of the engine knocking. When the predetermined advance value that is memorized in advance is reached, the advance angle is returned to the state of retarding zero, which was in the time during t1~t1' with the inclined angle dependent on time. In this manner, the waveforms of the ascending and the descending output shaft torques become like E and E', in which correction quantities of ignition time become smoother than C, D for ascending output shaft torque and C, D, c' and d' for descending output shaft torque. Their characteristics also become smooth.

In the examples shown in FIG. 1 and FIG. 5, the system having the turbine sensor 16, but this invention is not limited to that. The constitution can be changed to other various constitutions. If there is information of an engine rotation speed Ne and vehicle speed signal Vsp, almost the same control as mentioned in the above example can be carried out.

Figure 6:
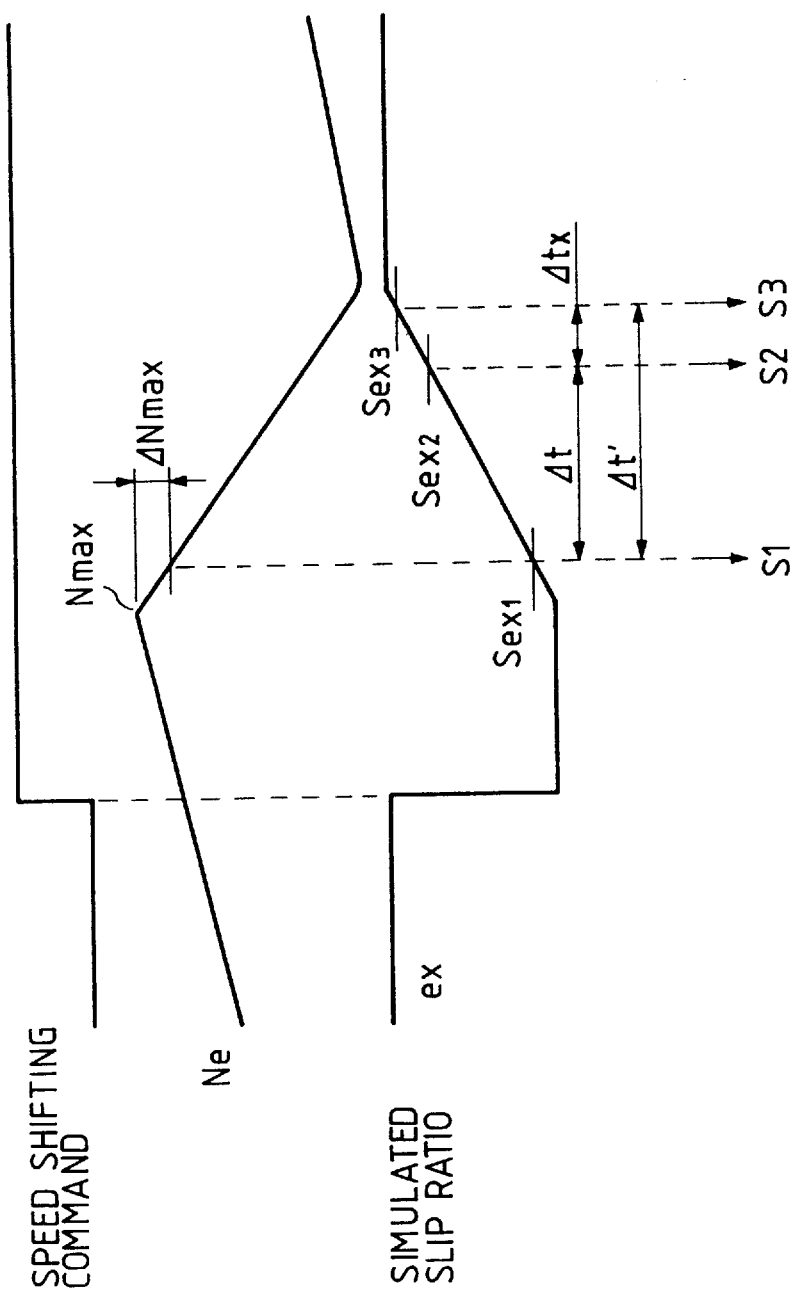
FIG. 6 shows a time chart for the determining method of the correction timing based on the engine rotation speed and the signal of the vehicle speed of this invention.

FIG. 6 shows a technique. It would be understood that the control timing corresponding to the slicing levels of S1, S2 and S3 could be determined by other methods without using information of the gear ratio of the turbine sensor. In the example of FIG. 6, the timing is determined by using two signals of engine rotation speed Ne and vehicle speed signal Vsp. The timing corresponding to S1 is decided by using information of the engine rotation speed Ne. After a gear shifting command is given, the newest value of the engine rotation speed, which is obtained in every sampling period, is compared with the last value. When the newest value is smaller than the last value, the last value is set as the maximum engine rotation speed Nmax at the time of gear shifting, which is once stored in RAM 24. Then, the time when the newest value Nenew of the engine rotation speed satisfies the formula of (Nmax−ΔNmax) ≧Ne new is set as the control timing corresponding to the slicing level of S1. Where ΔNmax is set and is memorized in ROM 23 in advance.

The control timing corresponding to the slicing levels of S2 and S3 is determined by using simulated slip ratio $ex$. Where simulated slip ratio ex is obtained as follows. That is, $$ex=(VSP\times(\text{gear ratio after gear shifting})/Ne), \qquad (1)$$

where VSPx(gear ratio after gear shifting) corresponds to the number of turbine revolutions Nt after gear shifting, it can be expressed by the formula of $ex$=Nt/Ne. The gear ratio is equivalent to the slip ratio of a torque converter. More accurately, the gear ratio corresponds to a slip ratio after gear shifting. VSP and Ne are values that are obtained by calculation every sampling period.

In FIG. 6, the value ex is calculated in accordance with equation (1) by inserting the gear ratio of the time when the gear shifting ends for the gear ratio after gear shifting, at the time of giving the gear shifting command. Therefore, upon giving the gear shifting command, simulated slip ratio $ex$ becomes small stepwise. When the Ne passes Nmax and begins decreasing, the decreasing of Ne ends at the time of ending of gear shifting, and the value ex is saturated to reache approximately a constant value. Thus, the simulated slip ratio corresponding to the slicing level of obtained S1 is set as Sex1 and is stored in RAM 24.

The time at which the value ex becomes larger than the predetermined first slicing level Sex2, which is memorized in advance, is set as the control timing corresponding to the slicing level of S2. The required time Δt between Sex1 and Sex2 is measured simultaneously. The time (Δt or Δtx of FIG. 6) for reaching Sex3 from second slicing level Sex3 which was set and memorized in advance, is determined by prediction calculation so that the control similar to FIG. 5 can be done by employing the control timing corresponding to the slicing level of S3.

Figure 7:
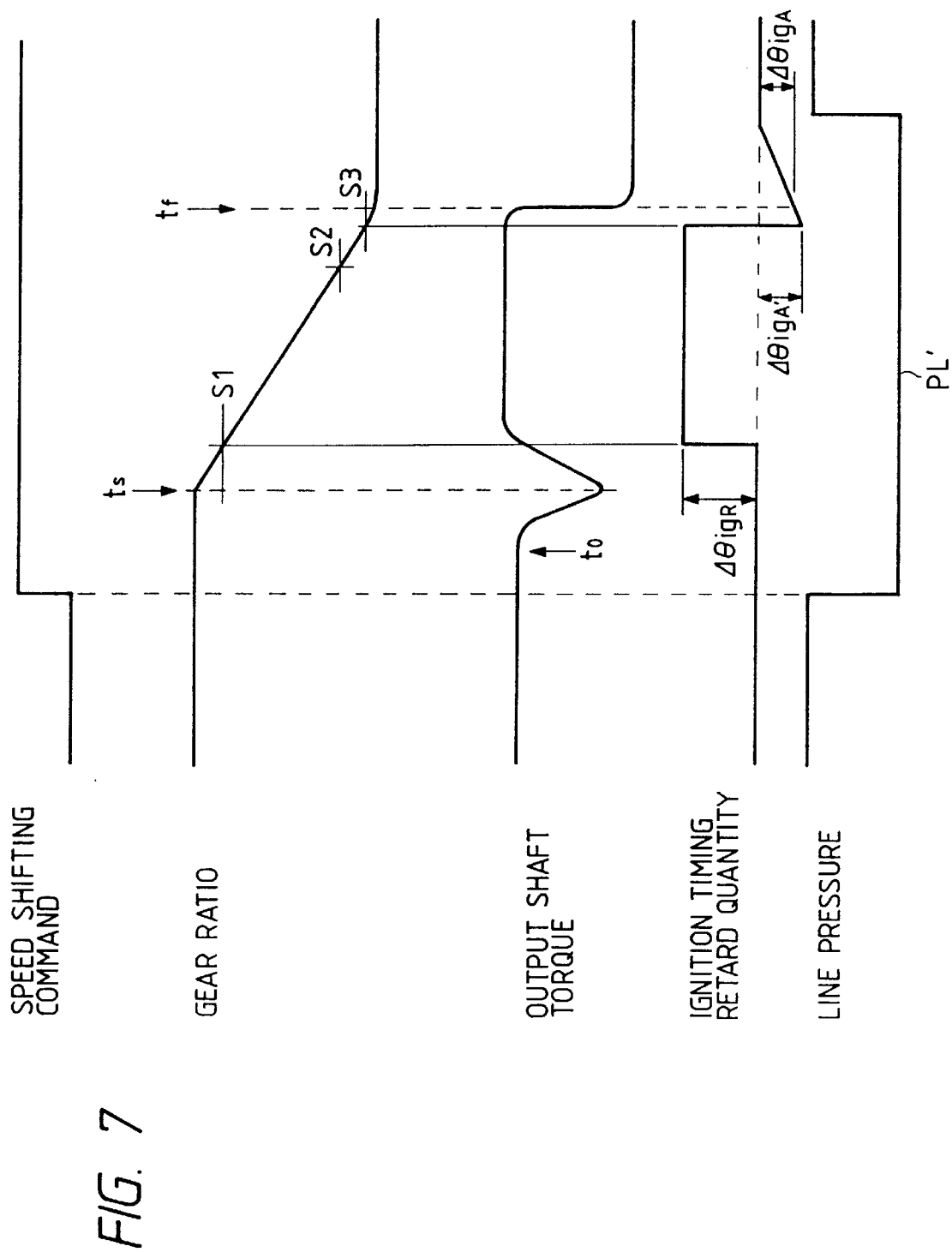
FIG. 7 shows a time chart for another method of up-shifting shock and its reduction.

FIG. 7 is a time chart for an explanation of another method of up-shifting shock reduction of this invention. As information for determining the control timing, a gear ratio is employed as an example as same as in FIG. 5, but a simulated slip ratio like FIG. 6 can be used.

The method of a reduction of FIG. 7 is characterized in that an ignition timing correction quantity is changed from ΔθigR (retard) to ΔθigA (advance) stepwise by the control timing of the above S3. Later, the ignition timing correction quantity is brought close zero after several time intervals. In this case, the quantity of an advance is ΔθigA' that is more advanced than ΔθigA in FIG. 5. It is desirable to compensate a temporary retarding characteristic which is an engine output torque characteristic dependent on the time-variant change (step change) of the correction quantity of an ignition time. As a result, it is possible to suppress a rapid increase of torque that occurs just before gear shifting end or the undershoot of torque that occurs immediately after gear shifting as shown in FIG. 4.

In the above explanation, while an ignition time is explained as an example of control parameter (element) of engine torque control during gear shifting, this invention is not limited to that. Almost same effects as in the above mentioned example can be achieved by controlling quantity of fuel.

Figure 8:
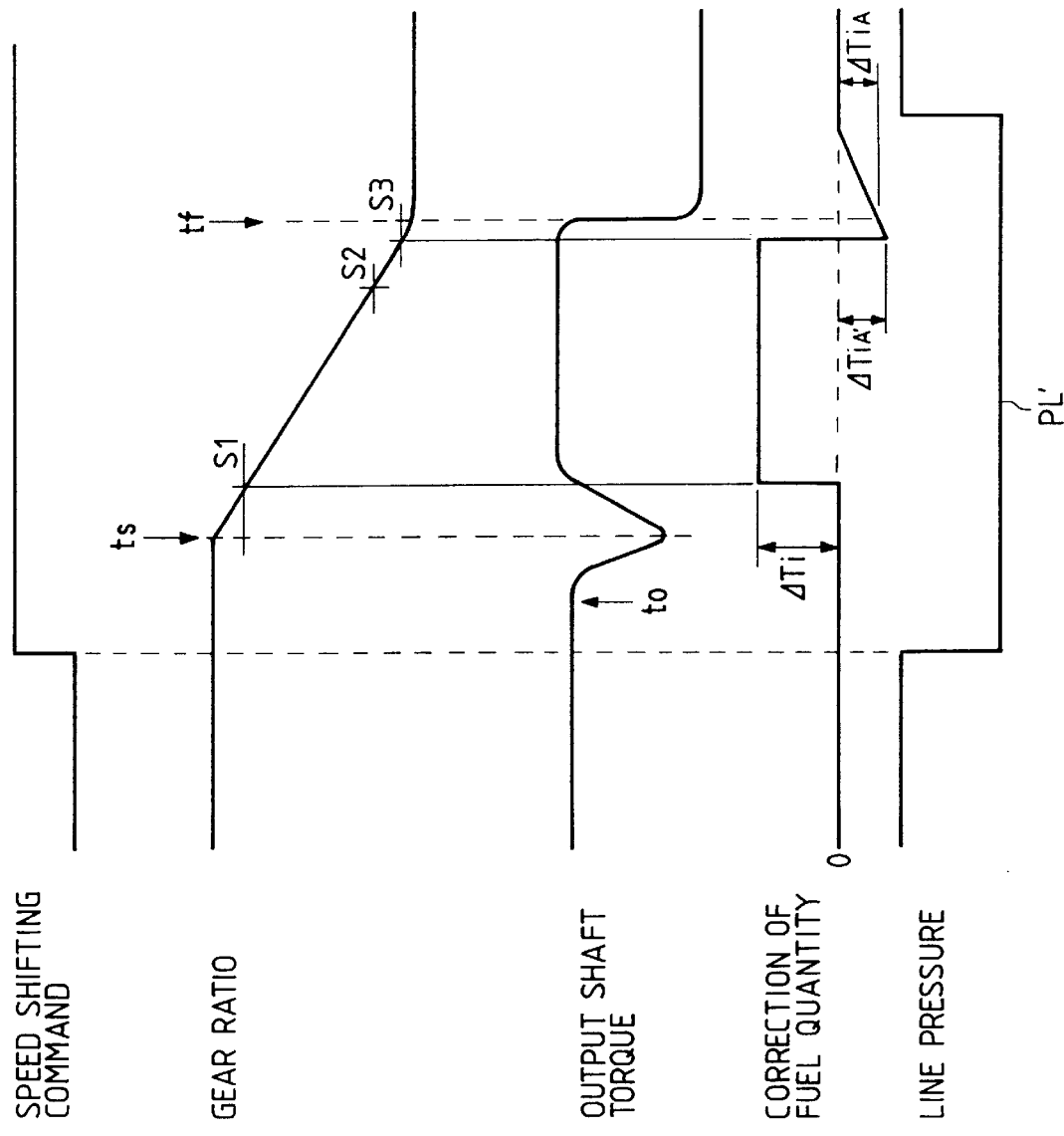
FIG. 8 shows a time chart for a still another method of up-shifting shock and its reduction.

FIG. 8 is a time chart for the method of up-shifting shock reduction using a quantity of fuel as a control parameter (element) of engine torque control during gear shifting. Basically, this method of up-shifting shock reduction is changed from the ignition timing correction quantity in FIG. 7 to the correction quantity of a quantity of fuel, and therefore the control timings for S1, S2 and S3 may be all the same. In the method shown in FIG. 8, a quantity of fuel ΔTi is subtracted from the normal quantity of fuel with timing S1, then the fuel correction quantity is changed stepwise from the subtraction of ΔTi to the addition of ΔTi' with the control timing of S3. Thereafter, the fuel correction quantity is brought close to zero every time interval.

In the method of the reduction using a quantity of fuel, it is possible to control and adjust the up-shifting shock by correcting a quantity of fuel, which is similar to the correction of the ignition time of the method using an ignition time as shown in FIG. 5.

According to the driving torque control device and the method for controlling the driving torque of the vehicle of this invention, the torque control of the engine can be done by setting the optimized characteristics of both the control timing for engine torque control during gear shifting and the control quantity. Thus, the gear shifting shock can be greatly reduced, compared with the conventional one, and the man-hour for designing the control timing of torque control of the engine during gear shifting can be made smaller than the conventional device.

What Is Claimed Is:

1. A driving torque control device for a vehicle comprising:
    means for calculating a torque control timing to determine and output at least two control timings of an engine torque generated by an engine during speed shifting;
    means for calculating and outputting an engine torque control quantity in response to the output from said torque control timing calculating means to calculate and output the engine torque control quantity; and
    means for controlling the engine torque during speed shifting in response to the outputs from said engine torque control quantity calculating means,
    wherein the engine torque is reduced by a certain quantity at a first timing of said engine torque control timings, followed by increasing the engine torque at the second engine torque control timing, and then returning the engine torque to the engine torque of the time immediately before the first engine torque control timing.

2. The driving torque control device for a vehicle according to claim 1, wherein said engine torque control means controls the engine torque by changing an ignition time during speed shifting.

3. The driving torque control device for a vehicle according to claim 1, wherein said engine torque control means controls an engine torque by changing quantity of fuel during speed shifting.

4. A driving torque control device for a vehicle comprising:

means for calculating a torque control timing to determine and output at least three control timings of an engine torque generated by an engine during speed shifting;

means for calculating and outputting an engine torque control quantity in response to the output from said torque control timing calculating means to calculate and output the engine torque control quantity; and means for controlling the engine torque during speed shifting in response to the outputs from said engine torque control quantity calculating means, wherein the third engine torque control timing of the three timings is predicted by the second engine torque control timing, followed by determining a time-variant change between the second and third engine torque control timings by said predicted engine torque control timing, and wherein the engine torque is reduced by a certain quantity at the first engine torque control timing; the engine torque is controlled at the second engine control timing in accordance with a time variant change of the engine torque between the second engine torque timing obtained by said engine torque control quantity calculating means and the third engine torque control timing; and the engine torque is returned to the state of the first engine torque control timing after the third engine torque control timing.

5. The driving torque control device for a vehicle according to claim 4, wherein said means for controlling engine torque controls the engine torque during speed shifting by changing an ignition time.

6. The driving torque control device for a vehicle according to claim 4, wherein said means for controlling engine torque controls the engine torque during speed shifting by changing a quantity of fuel.

7. A method of controlling a driving torque control for a vehicle comprising the steps of:

determining and outputting at least two engine torque control timings of a torque generated by an engine during speed shifting by means for calculating the torque control timing;

calculating and outputting an engine torque control quantity by means for calculating engine torque control quantity in response to the output from said engine torque control quantity calculating means;

controlling the engine torque during speed shifting by said engine torque control means in response to the output from said engine torque control calculating means; and reducing the engine torque by a certain quantity at the first engine control timing of the three timings; and returning the engine torque to the state of the first engine control timing after increasing the engine torque at the second engine control timing.

8. The method of controlling an engine torque for a vehicle according to claim 7, wherein the engine torque during speed shifting is controlled by changing an ignition time.

9. The method of controlling an engine torque for a vehicle according to claim 7, wherein the engine torque is controlled by changing a quantity of fuel.

10. A method of controlling a driving torque control for a vehicle comprising the steps of:

determining and outputting at least three engine torque control timings of a torque generated by an engine during speed shifting by means for calculating the torque control timing;

calculating and outputting an engine torque control quantity by means for calculating engine torque control quantity in response to the output from said engine torque control quantity calculating means;

wherein the third engine torque timing is predicted at the second engine torque control timing of the at least three timings, and a time-variant change of the engine torque between the second engine control timing and the third engine control timing is calculated by the predicted value, controlling the engine torque during speed shifting by said engine torque control means in response to the output from said engine torque control quantity calculating means;

reducing the engine torque by a certain quantity at the first engine control timing of the three timings;

controlling the engine torque at the second control timing in accordance with the time-variant change of the engine torque between the second control timing and the third engine torque control timing, both having been obtained by said engine torque control quantity calculating means; and returning the engine torque to the state of the first engine control timing after increasing the engine torque at the third engine control timing.

11. The method of controlling engine torque for a vehicle according to claim 10, wherein the engine torque during speed shifting is controlled by changing an ignition time.

12. The method of controlling engine torque for a vehicle according to claim 10, wherein the engine torque during speed shifting is controlled by changing a quantity of fuel.

* * * * *